United States Patent
Satoda (10) Patent No.: US 8,205,236 B2
(45) Date of Patent: Jun. 19, 2012

(54) CONTENTS DISTRIBUTION SYSTEM, CONTENTS DISTRIBUTION METHOD THEREOF AND CONTENTS DISTRIBUTION PROGRAM THEREOF

(75) Inventor: Kozo Satoda, Tokyo (JP)

(73) Assignee: NEC Corporation, Tokyo (JP)

( * ) Notice: Subject to any disclaimer, the term of this patent is extended or adjusted under 35 U.S.C. 154(b) by 1420 days.

(21) Appl. No.: 10/116,138

(22) Filed: Apr. 5, 2002

(65) Prior Publication Data

US 2002/0147980 A1 Oct. 10, 2002

(30) Foreign Application Priority Data

Apr. 9, 2001 (JP) .................................. 2001-110410

(51) Int. Cl.
*H04N 7/173* (2011.01)
(52) U.S. Cl. ................. 725/90; 725/86; 725/91; 725/93
(58) Field of Classification Search ...................... 725/90
See application file for complete search history.

(56) References Cited

U.S. PATENT DOCUMENTS

| | | | | |
|---|---|---|---|---|
| 5,450,209 A * | 9/1995 | Niimura et al. | ............... | 386/111 |
| 5,847,763 A | 12/1998 | Matsumura et al. | | |
| 5,887,110 A | 3/1999 | Sakamoto et al. | | |
| 5,900,904 A | 5/1999 | Okada et al. | | |
| 6,031,574 A | 2/2000 | Müller | | |
| 6,563,549 B1 * | 5/2003 | Sethuraman | .................. | 348/700 |
| 6,789,106 B2 * | 9/2004 | Eyer et al. | ...................... | 709/205 |
| 6,925,651 B2 * | 8/2005 | Foster et al. | ................... | 725/105 |
| 2003/0158899 A1 * | 8/2003 | Hughes | ......................... | 709/205 |

FOREIGN PATENT DOCUMENTS

| | | |
|---|---|---|
| EP | 0 656 728 A2 | 6/1995 |
| EP | 0 912 061 | 4/1999 |
| JP | 4-334189 | 11/1992 |
| JP | 5-252511 | 9/1993 |
| JP | 5-328324 | 12/1993 |
| JP | 7-23377 | 1/1995 |
| JP | 07-203420 | 8/1995 |
| JP | 7-298231 | 11/1995 |
| JP | 8-37660 | 2/1996 |
| JP | 08-336111 | 12/1996 |
| JP | 2596333 | 1/1997 |
| JP | 9-37245 | 2/1997 |
| JP | 09-074540 | 3/1997 |
| JP | 09-186970 | 7/1997 |
| JP | 2000-165827 | 6/2000 |

* cited by examiner

*Primary Examiner* — Kristine Kincaid
*Assistant Examiner* — Chenea Smith
(74) *Attorney, Agent, or Firm* — Foley & Lardner LLP (57) ABSTRACT

The contents distribution system for distributing contents to a terminal of each user through a communication network, including a distribution server which connects to each terminal through the communication network to distribute contents, in which the distribution server sequentially divides data of contents to be distributed into frames to generate frames coded by a predetermined plurality of different coding systems, selects, based on a request from the terminal of the user, a frame appropriate for the request from among the generated frames and transmits the selected frame to the terminal in question.

23 Claims, 8 Drawing Sheets

CONTENTS DISTRIBUTION SYSTEM, CONTENTS DISTRIBUTION METHOD THEREOF AND CONTENTS DISTRIBUTION PROGRAM THEREOF

BACKGROUNDS OF THE INVENTION

1. Field of the Invention

The present invention relates to distribution of information through a communication network and, more particularly, to a contents distribution system for efficiently distributing a large volume of contents such as video, a distribution method thereof, and a contents distribution program thereof.

2. Description of the Related Art

In recent years, increase in communication speed of the Internet, particularly, increase in radio communication speed, enables accumulated video contents such as films, advertisements and music promotion video to be viewed and listened by personal computers at home or cellular phones used outdoors. Distribution of live video is also conducted such as distribution of video taken by cameras including a Web camera disposed at sightseeing spots and on roads through the Internet.

Since these video data is very large in size and needs a communication path having an extremely wide band in order to distribute the data as it is, the data is distributed with its size reduced by an image compression coding technique. As a result, even when using a line whose band is approximately 64 kbps, distributing compressed video contents enables a user's terminal to receive and decode the contents to view the video.

In image coding techniques widely used in these days, both systems are employed, intraframe coding of conducting coding within a frame in order to achieve high compression and interframe coding of conducting coding between frames by making use of correlation between frames.

In general, interframe coding has a higher compression ratio than that of intraframe coding. In addition, in either of interframe coding and intraframe coding, increase in a compression ratio is followed by deterioration of images and decreasing a compression ratio to increase the amount of necessary information enables upgrading of image quality. Interframe coding has a higher compression ratio and enables transmission of video whose images have higher quality. The interframe coding, however, has a problem that since coding is conducted making use of correlation with a preceding frame, when the preceding frame can not be normally decoded due to an error occurring on a transmission path or for other reasons, the following frames can not be normally decoded either.

As a means for preventing the problem, well known is a method of refreshing a screen with an intraframe-coded frame inserted cyclically.

Here, when a cycle of inserting an intraframe-coded frame for refreshing is long, a refreshing interval is long, so that when an error occurs, a normal image can not be immediately restored. Conversely, when an insertion cycle is short, a rate of interframe coding is low to deteriorate image quality.

Among conventional techniques for solving the problem is, for example, the technique disclosed in Japanese Patent Laying-Open (Kokai) No. Heisei 05-252511. Proposed in Japanese Patent Laying-Open (Kokai) No. Heisei 05-252511 is a system for providing the service of distributing video coded by one video server to a plurality of terminals, which system has data obtained by intraframe-coding video to be distributed and data obtained by interframe-coding the same. Proposed in the art is ordinarily distributing interframe-coded data and when a new terminal is added as a distribution destination or when video of a terminal is disturbed, transmitting intraframe-coded data only to the terminal in question to enable the video to be viewed and a screen to be updated without affecting other terminals.

In addition to the above-described technique, conventional systems in which a server and a terminal one-to-one correspond to each other are, for example, the techniques disclosed in Japanese Patent Publication No. 2596333, Japanese Patent Laying-Open (Kokai) No. Hesei 07-023377 and Japanese Patent Laying-Open (Kokai) No. Hesei 04-334189. Proposed in these literature is a system of making a request to a transmission side server to change a coding method when a reception side terminal detects an error in received data. More specifically, switching a coding system from interframe coding used at normal operation to intraframe coding used at the time of error conducted at the server in response to a request from the terminal enables quick recovery of a disturbance of an image.

On the other hand, the conventional techniques disclosed in Japanese Patent Laying-Open (Kokai) No. Heisei 08-037660 and Japanese Patent Laying-Open (Kokai) No. Heisei 05-328324 propose a system in which, with one frame divided into a plurality of blocks, a part of blocks are coded by intraframe-coding and the remaining blocks are coded by interframe-coding to have each block delayed in time, thereby gradually conducting refreshing without the need of a special request from a terminal. Moreover, proposed in the conventional art disclosed in Japanese Patent Laying-Open (Kokai) No. Heisei 09-037245 is a system in which a reception side terminal detects a position of a block whose image is disturbed and notifies a server to that effect, thereby requesting transmission of intraframe-coded data of the block.

Refreshing of a screen by the transmission (re-transmission) of intraframe-coded data is required in some cases other than a case where an image is disturbed due to an error. In a case, for example, where a new terminal participates in television conference held among a plurality of points, the participant terminal is not allowed to decode an interframe-coded image unless it receives an intraframe-coded image. Therefore, the conventional technique disclosed in Japanese Patent Laying-Open (Kokai) No. Heisei 07-298231 proposes a system in which when a new terminal participates, by the request and reception of intraframe-coded image data to and from other terminal, normal video is quickly displayed after its participation.

Also in television conference held among a plurality of points in which a terminal at each point displays video from a terminal at other point, it is a common practice to make a request to the terminal at the point in question for transmission of intraframe-coded video data in order to switch the relevant video.

The multi-point television conference employs, other than a system of distributing video from a terminal to other plurality of terminals, a system having a multi-point conference control unit (MCU) to conduct communication between the MCU as a server and each terminal.

Figure 8:
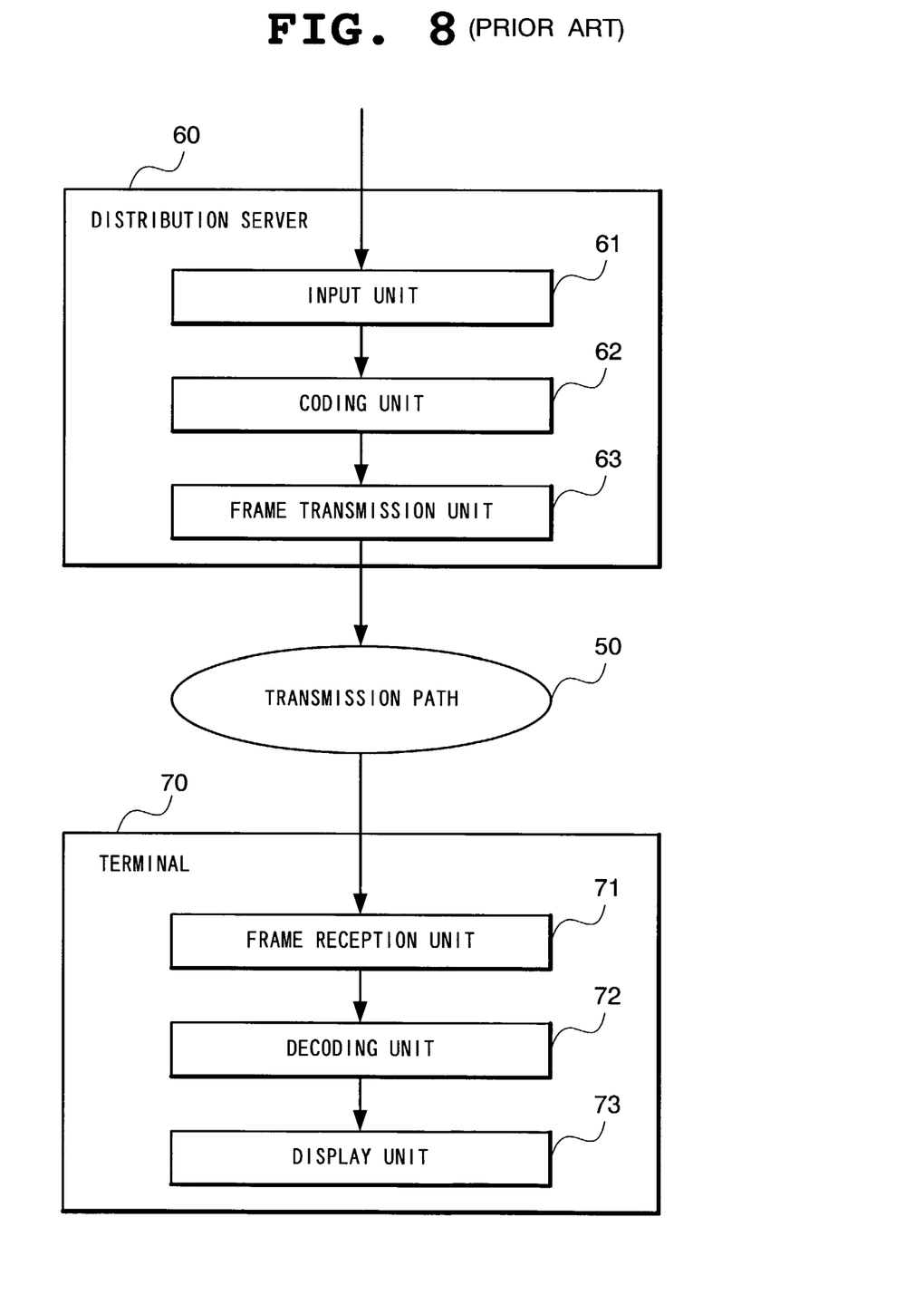
FIG. 8 is a block diagram showing a structure of a conventional contents distribution system.

Here, description will be made of conventional video distribution processing with reference to drawings. FIG. 8 is a block diagram showing a structure of a conventional contents distribution system, while FIG. 9 is a flow chart for use in explaining processing conducted by the conventional contents distribution system.

Figure 9:
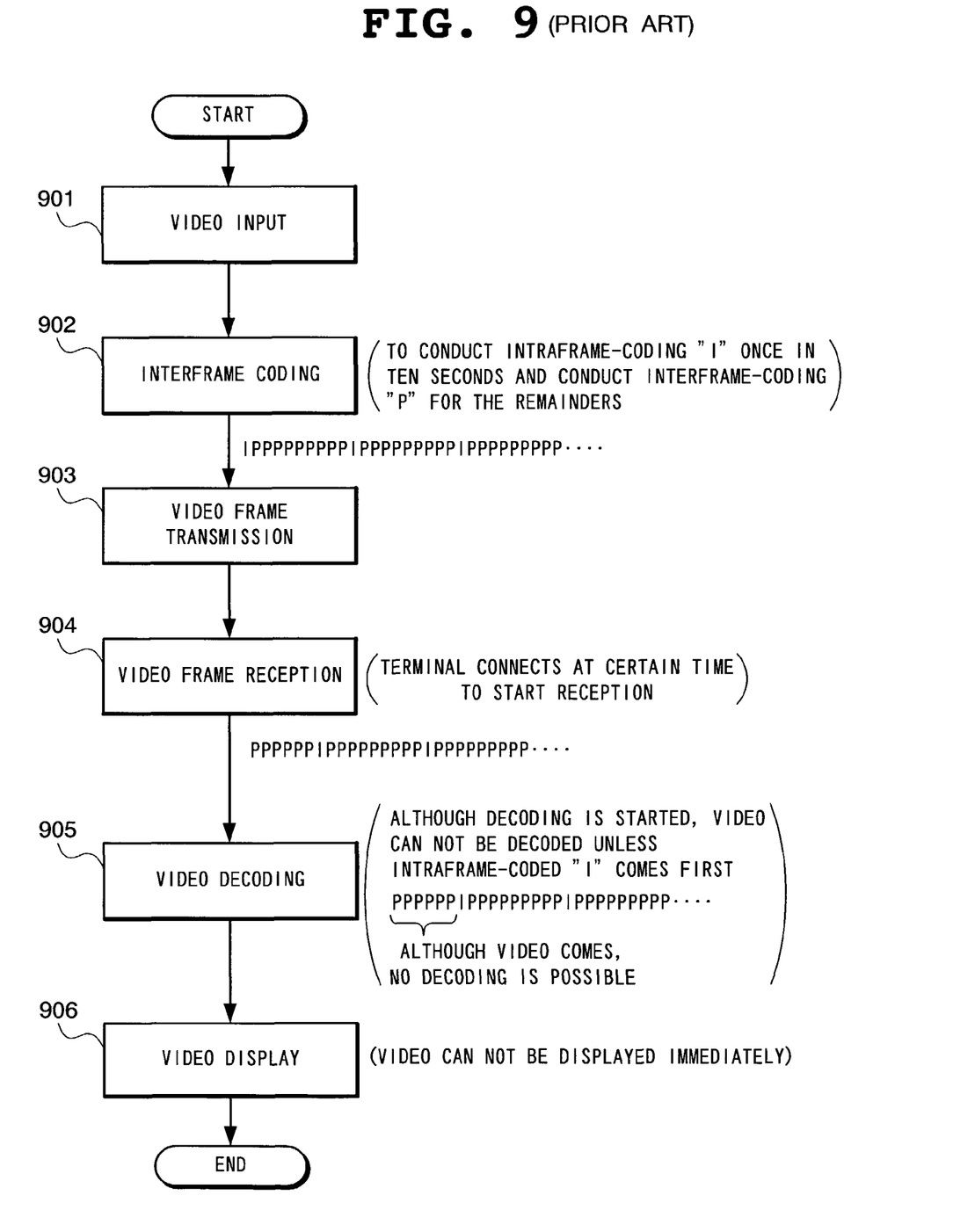
FIG. 9 is a flow chart for use in explaining processing conducted by the conventional contents distribution system.

With reference to FIGS. 8 and 9, in conventional video distribution, video applied to an input unit 61 (Step 901) has its video frame coded by an interframe coding unit 62 (Step 902) and the resultant data is transmitted to a terminal 70 by a video frame transmission unit 63 (Step 903).

Here, as a method of coding video, there have been developed MPEG as the ISO standard and H.26x series as the ITU standard. Commonly known use of a transmission path of a narrow band such as a radio line and a common telephone line is MPEG-4. Although the following description of coding will be made with respect to MPEG-4, the description is applicable also to common video coding because the principle is the same.

The interframe coding unit 62 ordinarily codes a video frame mainly using interframe coding for the purpose of efficient use of a transmission path. Since intraframe coding in general needs a larger volume of codes than those needed by interframe coding, when a band of a transmission path such as a radio line is narrow, many of frames are coded by interframe coding.

In many cases, however, intraframe-coded frames are inserted at fixed intervals because of the following reasons (1) and (2) and the like.

(1) When in an initial frame, if none of intraframe-coded data exists, data coded by interframe coding can not be decoded.

(2) When an error occurs at a transmission path, decoding data coded by interframe coding results in accumulating errors to disturb video, which phenomenon is conspicuous particular in a radio line depending on radio wave conditions.

An interval of inserting an intraframe-coded frame is determined in consideration of a frequency of occurrence of errors and band efficiency which represents how efficiently a band of a transmission path is used.

FIG. 9 shows that once in ten seconds, an intraframe-coded frame is inserted (indicated as "I" in the figure) and interframe-coded video frames are used as the remaining frames (indicated as "P" in the figure). Consideration will be given to a case where thus coded video frames are received by the terminal 70 starting at a certain time point.

A video frame received by a frame reception unit 71 (Step 904) is decoded by a decoding unit 72 (Step 905) and displayed at a display unit 73 (Step 906).

However, the decoding unit 72 is not allowed to decode video unless it first receives an intraframe-coded video frame "I". Since an interframe-coded video frame "P" is obtained by coding motion information obtained from preceding video, unless the preceding video is decoded, the interframe-coded video frame "P" can not be decoded. On the other hand, as to an intraframe-coded video frame "I", video of the frame can be decoded only with the video frame. In other words, unless first an intraframe-coded video frame "I" is received and decoded within the frame, the following video can not be decoded.

The interframe coding unit 62 codes an intraframe-coded video frame "I" at fixed intervals (at intervals of ten seconds here), which results in that video can be decoded only at this timing.

In a case, for example, where the frame reception unit 71 accidentally receives "I" as an initial frame, the decoding unit 72 is allowed to start decoding at the frame, while in a case where the unit receives "P" subsequent to "I" as an initial frame, the decoding unit 72 is not allowed to decode video because it receives a video frame for remaining a little less than ten seconds but fails to receive "I", so that a user will be kept waiting approximately for ten seconds with no video displayed after issuing a request for viewing a program. The waiting time, excluding a delay in a system, is zero second at the minimum and an intraframe coding interval (ten seconds here) at the maximum, whose average is half the intraframe coding interval (five seconds here).

On the other hand, on a radio line, when an error occurs on a transmission path due to radio wave conditions, decoding the data coded by interframe coding accumulates errors to in some cases disturb an image which will remain disturbed until an intraframe-coded video frame "I" is received. Also in this case, from when the video starts being disturbed until when an intraframe-coded video frame is received to rectify the disturbance of the image, zero second is required at the minimum, an intraframe coding interval (ten seconds here) at the maximum and half the intraframe coding interval (five seconds here) on average.

In order to eliminate these shortcomings, an intraframe coding interval should be as a matter of course shortened. However, since the amount of codes for intraframe coding is larger than that of interframe coding, the amount of transmittable information of video is smaller than that of a case where an interval of intraframe coding is long. In a case where a radio communication path or a common telephone line is used, in particular, when a band of a transmission path is narrow, image quality will be degraded.

As described in the foregoing, the conventional systems have the following problems.

First, the above-described conventional techniques are mainly applied to one-to-one video distribution, television conference and multi-point television conference and are related to systems for transmitting data individually to each terminal, which fail to take distribution of video data taken by a Web camera etc. to a plurality of terminals into consideration.

In a case, for example, where a new terminal participates in viewing or listening to video or where video refresh is requested due to a disturbance of video, a request for intraframe coding is made to a server as described above. In a system of transmitting data to all the terminals, however, when the server conducts intraframe coding, the same intraframe-coded video will be transmitted to other terminals which execute decoding normally, resulting in decreasing a rate of interframe coding to deteriorate image quality.

Secondly, conventional art fails to take into consideration a mode in which a plurality of kinds of videos (hereinafter referred to as programs) are distributed in video distribution to a plurality of terminals. It is conventionally impossible, for example, to view and listen to various video contents with a program to be received switched by means of a portable communication terminal outdoors.

SUMMARY OF THE INVENTION

An object of the present invention is to solve the shortcomings of the above-described conventional art and provide a contents distribution system allowing efficient distribution of contents from a server to a plurality of terminals and allowing each terminal to freely select and change the contents to be viewed and listened, a distribution method thereof, and a contents distribution program thereof.

Another object of the present invention is to provide a contents distribution system allowing one or a plurality of video contents to be distributed to a plurality of terminals and allowing each terminal to view and listen to video contents while freely changing a program, a distribution method thereof, and a contents distribution program thereof.

A further object of the present invention is to provide a contents distribution system capable of, when a user's terminal starts viewing or listening or changes a program, quickly displaying a program and presenting the same to the user in response to a user's request and when video is disturbed due to an error on a transmission path or the like, rectifying the disturbance of the video quickly upon user's issuance of a video refresh request, a distribution method thereof, and a contents distribution program thereof.

A still further object of the present invention is to provide a contents distribution system capable of efficiently distributing video contents even when a video contents supply place and a place where a main body which conducts video distribution is located are away from each other and capable of quickly coping with program viewing start, program change and program video refresh as is realized by the second embodiment and a distribution method thereof, and a contents distribution program thereof.

According to the first aspect of the invention, a contents distribution system for distributing contents to a terminal of each user through a communication network, comprises a distribution server which connects to each the terminal through the communication network to distribute contents, wherein the distribution server sequentially divides data of contents to be distributed into frames to generate frames coded by a predetermined plurality of different coding systems, selects, based on a request from the user's terminal, a frame appropriate for the request from among the generated frames and transmits the selected frame to the terminal in question.

In the preferred construction, the distribution server includes for each contents to be distributed, contents input means for sequentially dividing data of the contents to be distributed into frames to generate frames coded by a predetermined plurality of different coding systems, and for each the terminal of a distribution destination, frame selection means for selecting, based on a request from the user's terminal, a frame appropriate for the request from among frames output from the contents input means, each the frame selection means including multicast transmission means for receiving in a multicast way a frame output from each the contents input means.

In another preferred construction, the contents input means executes intraframe coding, which is coding based on data in an individual frame, of each frame of contents to be distributed to generate an intraframe-coded frame, executes interframe coding, which is coding based on data in an individual frame and correlation between the frames, of each frame of contents to be distributed to generate an interframe-coded frame, and sequentially outputs both of the intraframe-coded frame and the interframe-coded frame.

In another preferred construction, when accepting, from the user's terminal, a request for distribution of new contents, a request for distribution of another contents and a refresh request for the purpose of the elimination of an occurring failure, the frame selection means selects an intraframe-coded frame of the contents in question as a frame to be transmitted to the terminal in question.

In another preferred construction, the contents input means includes a contents obtaining unit for obtaining data of contents, and a contents accepting unit for receiving data of the contents from the contents obtaining unit through the communication network, the contents obtaining unit sequentially dividing data of the obtained contents into frames, generating an interframe-coded frame and transmitting the generated frame to the contents accepting unit through the communication network, and the contents accepting unit sequentially outputting both an interframe-coded frame received from the contents obtaining unit and an intraframe-coded frame of the contents in question which is generated by decoding the interframe-coded frame in question and then intraframe-coding the decoded frame.

In another preferred construction, the distribution server includes means for recording information of a kind of contents to be distributed as a program list and transmitting said program list recorded to said user's terminal.

In another preferred construction, the contents are video contents.

According to the second aspect of the invention, a terminal device for receiving distribution of video contents from a distribution server through a communication network and displaying the video contents, wherein the terminal device, when a failure occurs during reception of video contents to be distributed, issues a refresh request for requesting elimination of the occurring failure to the distribution server.

In the preferred construction, the terminal device further comprises means for issuing a request, to the distribution server, for transmission of information about a kind of video contents to be distributed from the distribution server and receiving and displaying the information about a kind of the video contents.

According to the third aspect of the invention, a contents distribution server as a server unit for distributing contents to a terminal of each user through a communication network, wherein the contents distribution server sequentially divides data of contents to be distributed into frames to generate frames coded by a predetermined plurality of different coding systems, selects, based on a request from the user's terminal, a frame appropriate for the request from among the generated frames and transmits the selected frame to the terminal in question.

In the preferred construction, the contents distribution server includes for each contents to be distributed, contents input means for sequentially dividing data of the contents to be distributed into frames to generate frames coded by a predetermined plurality of different coding systems, and for each the terminal of a distribution destination, frame selection means for selecting, based on a request from the user's terminal, a frame appropriate for the request from among frames output from the contents input means, wherein each the frame selection means including multicast transmission means for receiving in a multicast way a frame output from each the contents input means.

In another preferred construction, the contents input means executes intraframe coding, which is coding based on data in an individual frame, of each frame of contents to be distributed to generate an intraframe-coded frame, executes interframe coding, which is coding based on data in an individual frame and correlation between the frames, of each frame of contents to be distributed to generate an interframe-coded frame, and sequentially outputs both of the intraframe-coded frame and the interframe-coded frame.

In another preferred construction, when accepting, from the user's terminal, a request for distribution of new contents, a request for distribution of another contents and a refresh request for the purpose of the elimination of an occurring failure, the frame selection means selects an intraframe-coded frame of the contents in question as a frame to be transmitted to the terminal in question.

In another preferred construction, the contents input means includes a contents obtaining unit for obtaining data of contents, and a contents accepting unit for receiving data of the contents from the contents obtaining unit through the communication network, the contents obtaining unit sequentially dividing data of the obtained contents into frames, generating an interframe-coded frame and transmitting the generated frame to the contents accepting unit through the communication network, and the contents accepting unit sequentially outputting both an interframe-coded frame received from the contents obtaining unit and an intraframe-coded frame of the contents in question which is generated by decoding the interframe-coded frame in question and then intraframe-coding the decoded frame.

In another preferred construction, the distribution server includes means for recording information of a kind of contents to be distributed as a program list and transmitting the program list recorded to the user's terminal.

According to another aspect of the invention, a distribution method of distributing contents to a terminal of each user through a communication network, comprising the steps of sequentially dividing data of contents to be distributed into frames, generating frames coded by a predetermined plurality of different coding systems, and based on a request from the user's terminal, selecting a frame appropriate for the request from among the generated frames and transmitting the selected frame to the terminal in question.

In the preferred construction, the distribution method comprising the steps of for each contents to be distributed, sequentially dividing data of the contents to be distributed into frames to generate frames coded by a predetermined plurality of different coding systems, for each the terminal of a distribution destination, selecting, based on a request from the user's terminal, a frame appropriate for the request from among the generated frames, and in the frame selection, receiving the frame in a multicast way.

In another preferred construction, the distribution method comprising, in the frame generation, the steps of executing intraframe coding, which is coding based on data in an individual frame, of each frame of contents to be distributed to generate an intraframe-coded frame, executing interframe coding, which is coding based on data in an individual frame and correlation between the frames, of each frame of contents to be distributed to generate an interframe-coded frame, and sequentially outputting both of the intraframe-coded frame and the interframe-coded frame.

In another preferred construction, the distribution method comprising, in said frame selection, the step of, when accepting from said user's terminal a request for distribution of new contents, a request for distribution of another contents and a refresh request for the purpose of the elimination of an occurring failure, selecting an intraframe-coded frame of the contents in question as a frame to be transmitted to the terminal in question.

In another preferred construction, the distribution method comprising, in the frame generation, the steps of obtaining data of contents and sequentially dividing data of the obtained contents into frames to generate an interframe-coded frame, receiving the frame through the communication line to sequentially outputting both the interframe-coded frame received and an intraframe-coded frame of the contents in question which is generated by decoding the interframe-coded frame in question and then intraframe-coding the decoded frame.

In another preferred construction, the distribution method, further comprising the step of recording information of a kind of contents to be distributed as a program list and transmitting the program list recorded to the user's terminal.

According to a further aspect of the invention, a contents distribution program for distributing contents to a terminal of each user through a communication network by controlling a computer, comprising the functions of sequentially dividing data of contents to be distributed into frames, generating frames coded by a predetermined plurality of different coding systems, and based on a request from the user's terminal, selecting a frame appropriate for the request from among the generated frames and transmitting the selected frame to the terminal in question.

Other objects, features and advantages of the present invention will become clear from the detailed description given herebelow.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings.

DESCRIPTION OF THE PREFERRED EMBODIMENT

The preferred embodiment of the present invention will be discussed hereinafter in detail with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to unnecessary obscure the present invention.

Figure 1:
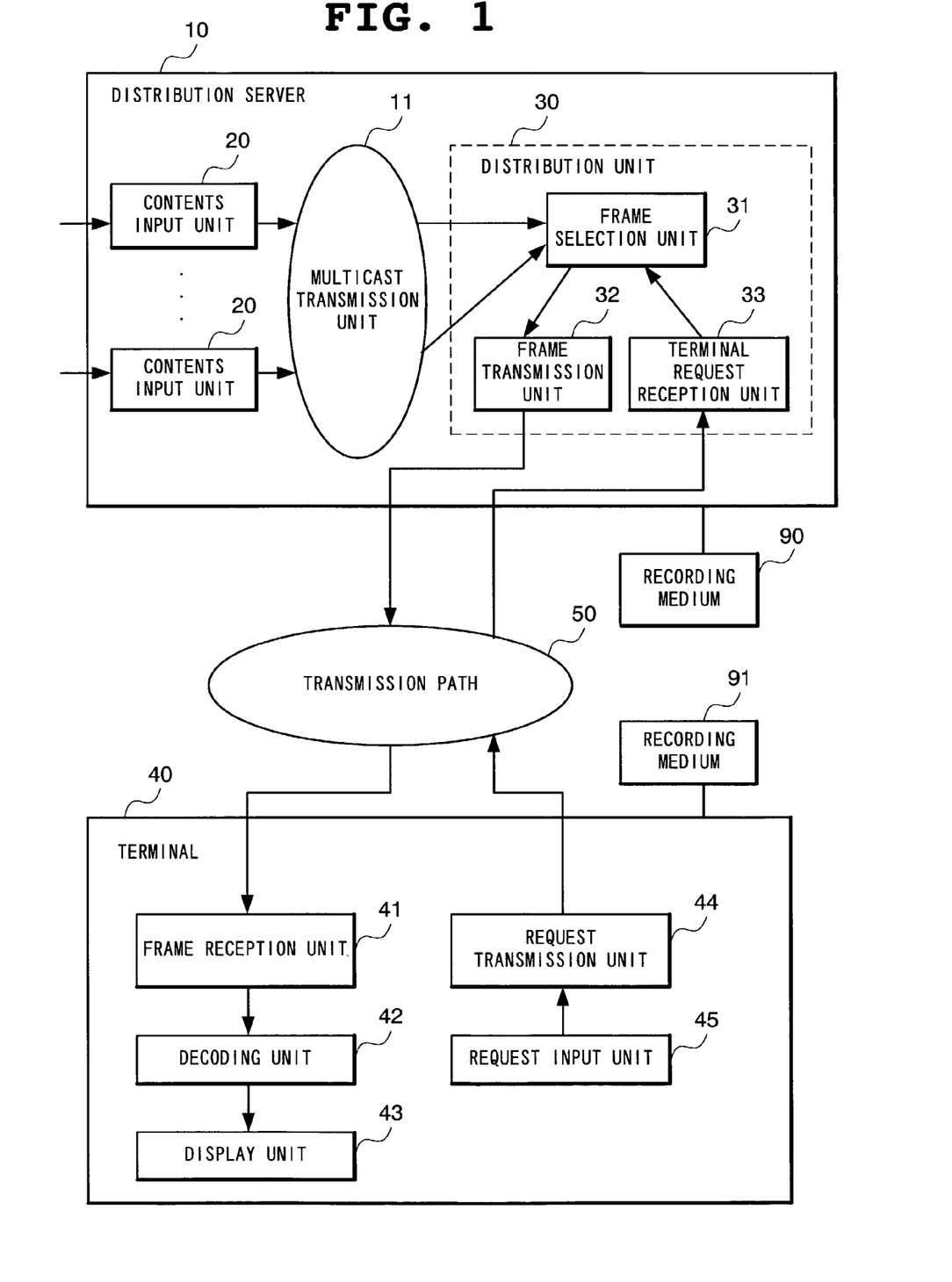
FIG. 1 is a block diagram showing a structure of a contents distribution system according to a first embodiment of the present invention.
Figure 2:
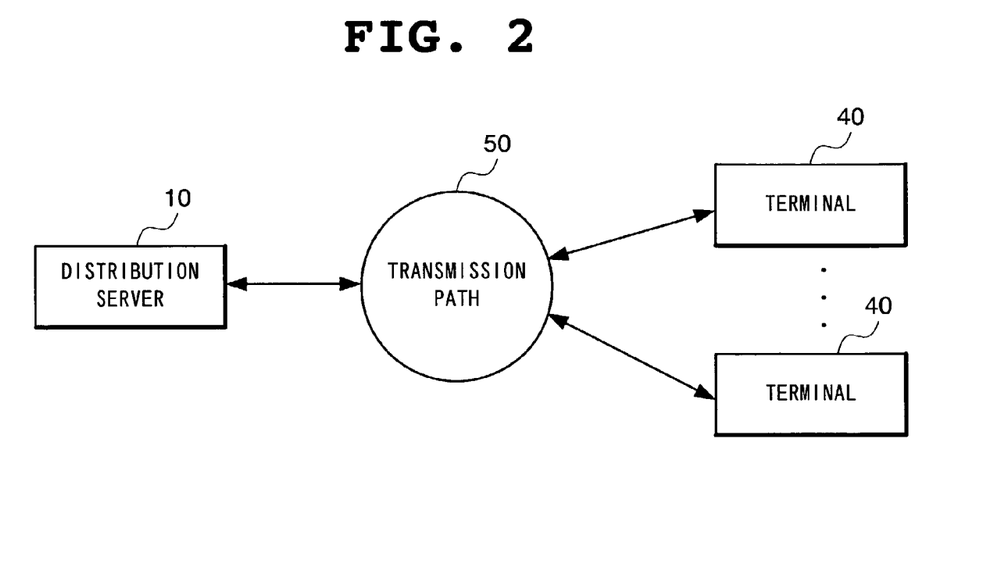
FIG. 2 is a block diagram showing a network structure of the contents distribution system according to the first embodiment of the present invention.

FIG. 1 is a block diagram showing a structure of a contents distribution system according to a first embodiment of the present invention, while FIG. 2 is a block diagram showing a network structure of the contents distribution system according to the present embodiment.

With reference to FIGS. 1 and 2, the contents distribution system of the present embodiment includes a distribution server 10 for distributing contents and a user's terminal 40, a terminal device for receiving distribution of contents, which are connected to each other through a transmission path 50 to distribute contents.

Here, the contents to be distributed are such contents having a large volume of data as video contents, which are coded (compressed) by the distribution server 10 there at the time of distribution to the terminal 40. Target contents mainly include video contents transmitted in a broadcast way such as broadcast video of a live camera or a television which monitors a congestion state of a highway and the like and which shoots scenery at a sightseeing spot. Video contents accumulated in an internal storage unit, read and coded there are target contents as well.

Although as the transmission path (communication network) 50 connecting the distribution server 10 and the terminal 40, no specific limitation is placed and any transmission path can be used, having usage for viewing and listening to video contents by means of a portable terminal outdoors and for viewing and listening to video contents at home in mind and assuming usage for common radio lines of a cellular telephone and PHS and for common telephone lines such as ISDN, description will be here made of a case where the path has approximately 64 kbps to 384 kbps.

Video contents here are assumed to include moving pictures of a live camera and broadcast video and their corresponding voice and music.

The distribution server 10 includes a contents input unit 20 for accepting input of contents to be distributed and coding the same and a distribution unit 30 for transmitting contents to the user's terminal 40. Then, the contents input unit 20 and the distribution unit 30 are connected by a multicast transmission unit 11, thereby multicast-transmitting data of coded contents output from each contents input unit 20 to each distribution unit 30.

The distribution server 10 here handles distribution of one or a plurality of contents and when coping with distribution of a plurality of contents, it is provided with the contents input unit 20 corresponding to each content for processing the contents. In addition, the distribution server 10 distributes contents to one or a plurality of terminals 40 and when coping with distribution to a plurality of terminals 40, it is provided with the distribution unit 30 corresponding to each terminal 40 for processing transmission of data to each terminal 40.

Figure 3:
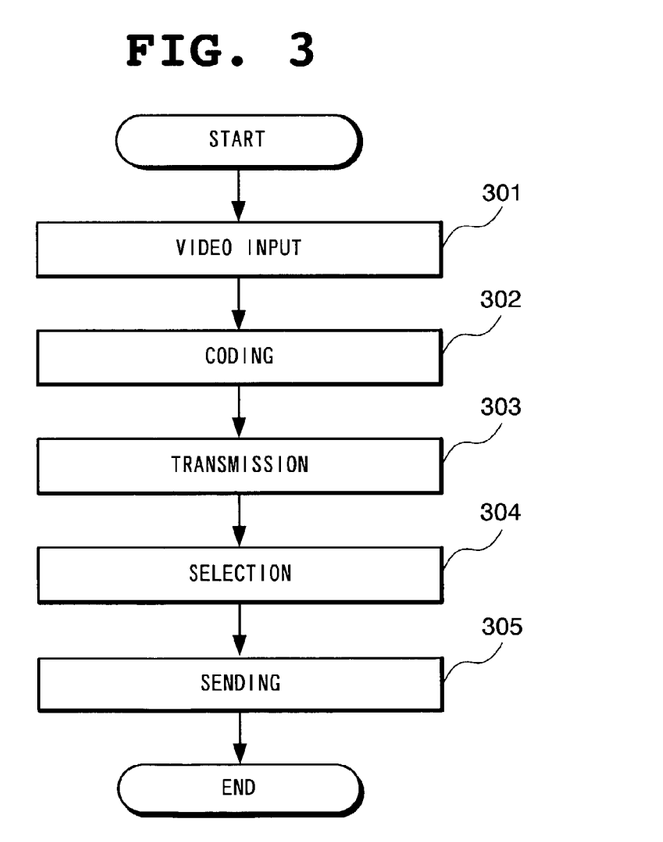
FIG. 3 is a flow chart for use in explaining processing conducted by the contents distribution system according to the first embodiment of the present invention.

FIG. 3 is a flow chart for use in explaining processing of the contents distribution system according to the present embodiment.

First, the contents input unit 20 accepts input of video contents (Step 301) to code the video contents by a predetermined coding system (Step 302) and transmits the coded contents to a frame selection unit 31 through the multicast transmission unit 11 (Step 303).

Upon input of a program which a user wants to view or listen to from the terminal 40, a terminal request reception unit 33 receives a request from the terminal and informs the frame selection unit 31 of the request. The frame selection unit 31 selectively receives the requested program from the multicast transmission unit 11 and transfers video of its contents to a frame transmission unit 32 (Step 304). The frame transmission unit 32 transmits the requested contents to the terminal 40 (Step 305).

Here, the contents input unit 20 is prepared one for video contents to be distributed and when, for example, ten programs are to be distributed, as many contents input units 20 as the number of the programs are prepared, resulting in that a total of ten contents input units 20 are required for the distribution server 10. In addition, the frame selection unit 31 and the frame transmission unit 32 are required one each for one terminal 40 connected and in a case, for example, where contents distribution service is to be provided for 100 terminals, 100 frame selection units 31 and frame transmission units 32 are required.

The terminal request reception unit 33 may be provided corresponding to each terminal connected or one terminal request reception unit 33 may accept requests from all the terminals 40 and with description prepared by the terminal 40 which indicates a corresponding relationship between the terminal 40 connected and the frame selection unit 31, the one terminal request reception unit 33 which accepts the requests as a representative may issue a request to the corresponding frame selection unit 31 based on the description of the correspondences.

Among possible methods of selecting video of a plurality of programs transmitted from a plurality of contents input units 20 by a plurality of frame selection units 31 corresponding to the respective terminals are, other than the multicast transmission system of the present embodiment, a unicast system in which the frame selection unit 31 directly connects to a relevant contents input unit 20 to receive data and a broadcast system in which the contents input unit 20 transmits video to all the frame selection units 31 which selectively receive video.

In term of efficiency, however, the multicast system using the multicast transmission unit 11 of the present embodiment shown in FIG. 1 is preferable. More specifically, the contents input unit 20 transmits video data to a multicast network, the frame selection unit 31 receives necessary video data from the multicast network and the multicast transmission unit 11 on the way refrains from relaying unnecessary data. Thus using multicasting produces the advantage that even when the number of contents or the number of terminals is increased, video transmission efficiency within the distribution server remains unchanged.

The terminal 40 receives input of a program which a user wants to view or listen to through a request input unit 45 and issues a request to the distribution server 10 from a request transmission unit 44. The distribution server 10 transmits video corresponding to the program, so that a frame reception unit 41 receives the video, a decoding unit 42 decodes the video and a display unit 43 displays the same.

As described in the foregoing, according to the contents distribution system according to the present embodiment, upon designation of a program a user wants to view by means of the terminal 40, the distribution server 10 switches to the corresponding program video and transmits the same to the terminal 40, thereby enabling the user to view and listen to the desired program.

Figure 4:
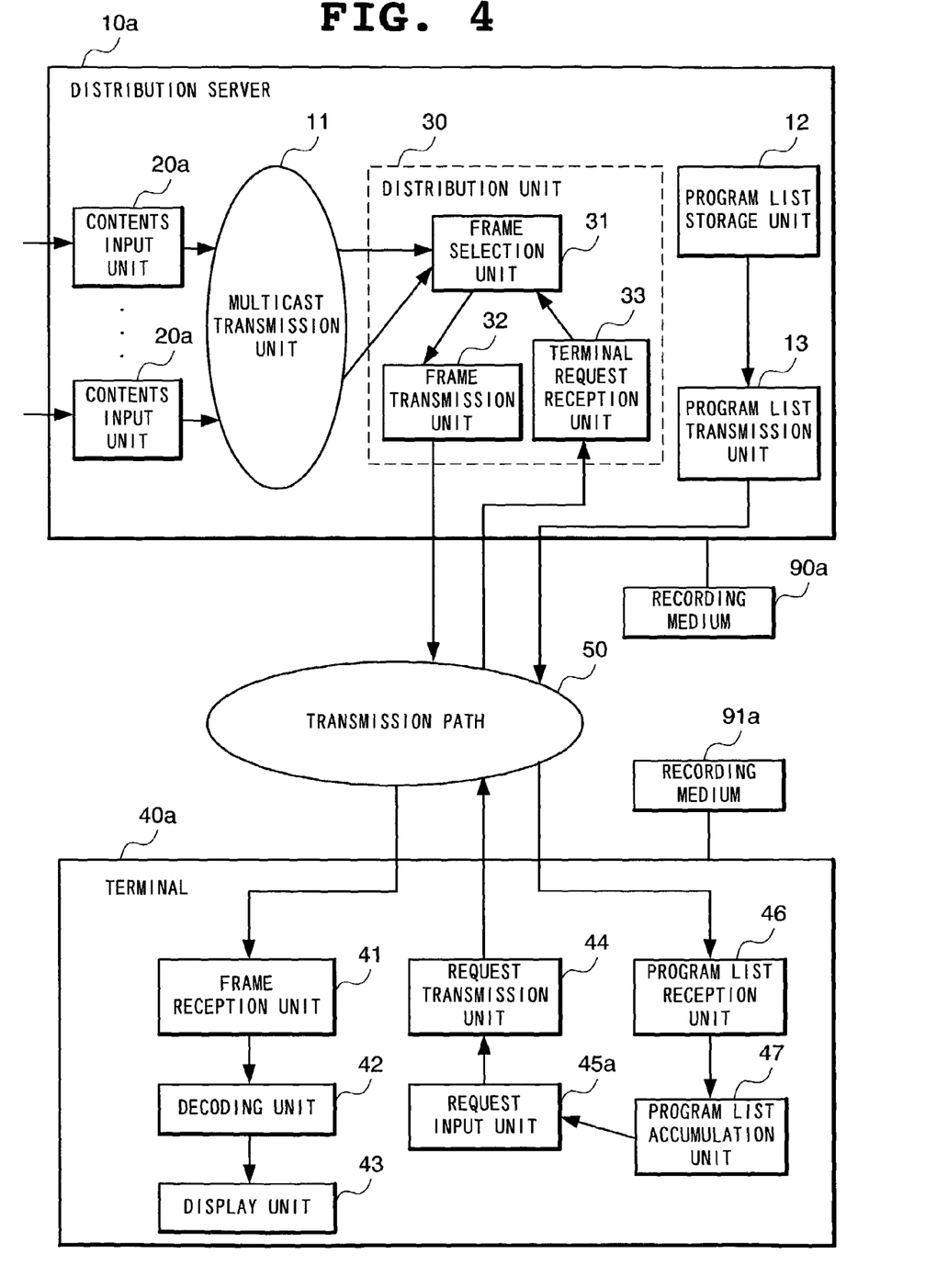
FIG. 4 is a block diagram showing another example of a structure of the contents distribution system according to the first embodiment of the present invention.

Next, description will be made of other example of a structure of the contents distribution system according to the first embodiment other than that shown in FIG. 1. FIG. 4 is a block diagram showing another example of a structure of the contents distribution system according to the present embodiment.

In the example of a structure shown in FIG. 4, a distribution server 10a stores, in a program list storage unit 12, a program list of video contents which a user can view and listen to by means of a terminal 40a and transmits the list to the terminal 40a through a program list transmission unit 13. At the terminal 40a, a program list reception unit 46 receives a program list and a program list accumulation unit 47 accumulates the same.

As the program list transmission unit 13 of the distribution server 10a, a commonly used WWW server, for example, can be employed and as the program list reception unit 46 of the terminal 40a, a WWW client such as the i-mode can be used.

The user selects his/her preferable program from the program list accumulated at the program list accumulation unit 47 and inputs the program to a request input unit 45a to make a request from the request transmission unit 44 to the distribution server 10a. The distribution server 10a transmits the corresponding video contents to the terminal 40a according to the user's request. At the terminal 40a, the video frame is received by the frame reception unit 41, decoded by the decoding unit 42 and displayed by the display unit 43. While the contents are being displayed, when the user selects a different program from the request input unit 45a, the request transmission unit 44 issues a program change request and its corresponding video contents are responsively transmitted.

Next, description will be made of a structure of the distribution server 10a in the structure exemplified in FIG. 4.

The program list storage unit 12 and the program list transmission unit 13 are as described above. Upon receiving a request for a program that the user wants to view or listen to from the terminal 40, the terminal request reception unit 33, when not assigned the frame selection unit 31 corresponding to video distribution to the terminal 40 in question, assigns one frame selection unit 31. The unit 33 issues a request for viewing and listening to a program to the newly assigned frame selection unit 31 or when the frame selection unit 31 is already assigned, to the frame selection unit 31 in question, to select a contents input unit 20a conducting video coding of the corresponding video contents and receive input of video data which is an output of the unit 20a.

Figure 5:
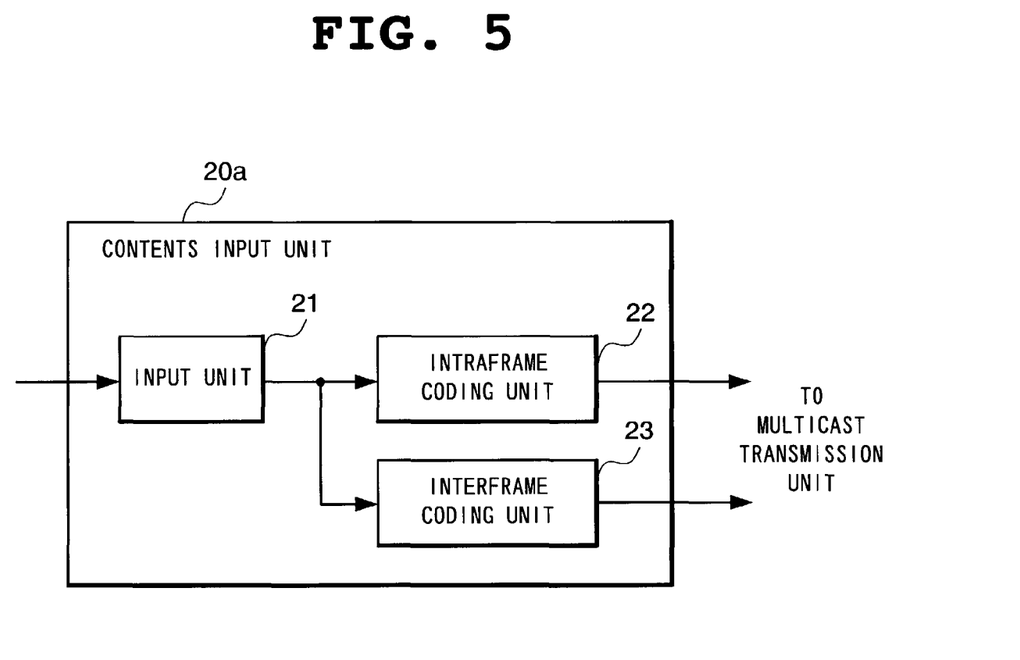
FIG. 5 is a block diagram showing a structure of a contents input unit of the first embodiment of the present invention.

FIG. 5 is a block diagram showing a structure of the contents input units 20 and 20a of the present embodiment.

In the contents input unit 20a, video contents input through an input unit 21 are coded by an intraframe coding unit 22 and an interframe coding unit 23 for the purpose of video contents transmission. Here, the intraframe coding unit 22 conducts coding based only on information in a frame. On the other hand, the interframe coding unit 23 conducts interframe coding by which the amount of information of video is reduced by extracting motion information from between sequential frames and coding the motion information.

Upon reception of a request for viewing and listening to a program or for changing a program, the frame selection unit 31 first selects an intraframe-coded frame which is coded by the intraframe coding unit 22 as a first frame to be transmitted to the terminal 40. As frames to be subsequently transmitted to the terminal 40, the unit 31 sequentially selects interframe-coded frames which are coded by the interframe coding unit 23.

By thus selecting a frame by the frame selection unit 31, efficient use of a band of a transmission path is enabled to quickly cope with program change and the like.

Next, description will be made of video transmission processing by means of the frame selection unit 31 according to the present embodiment shown in FIG. 6.

Figure 6:
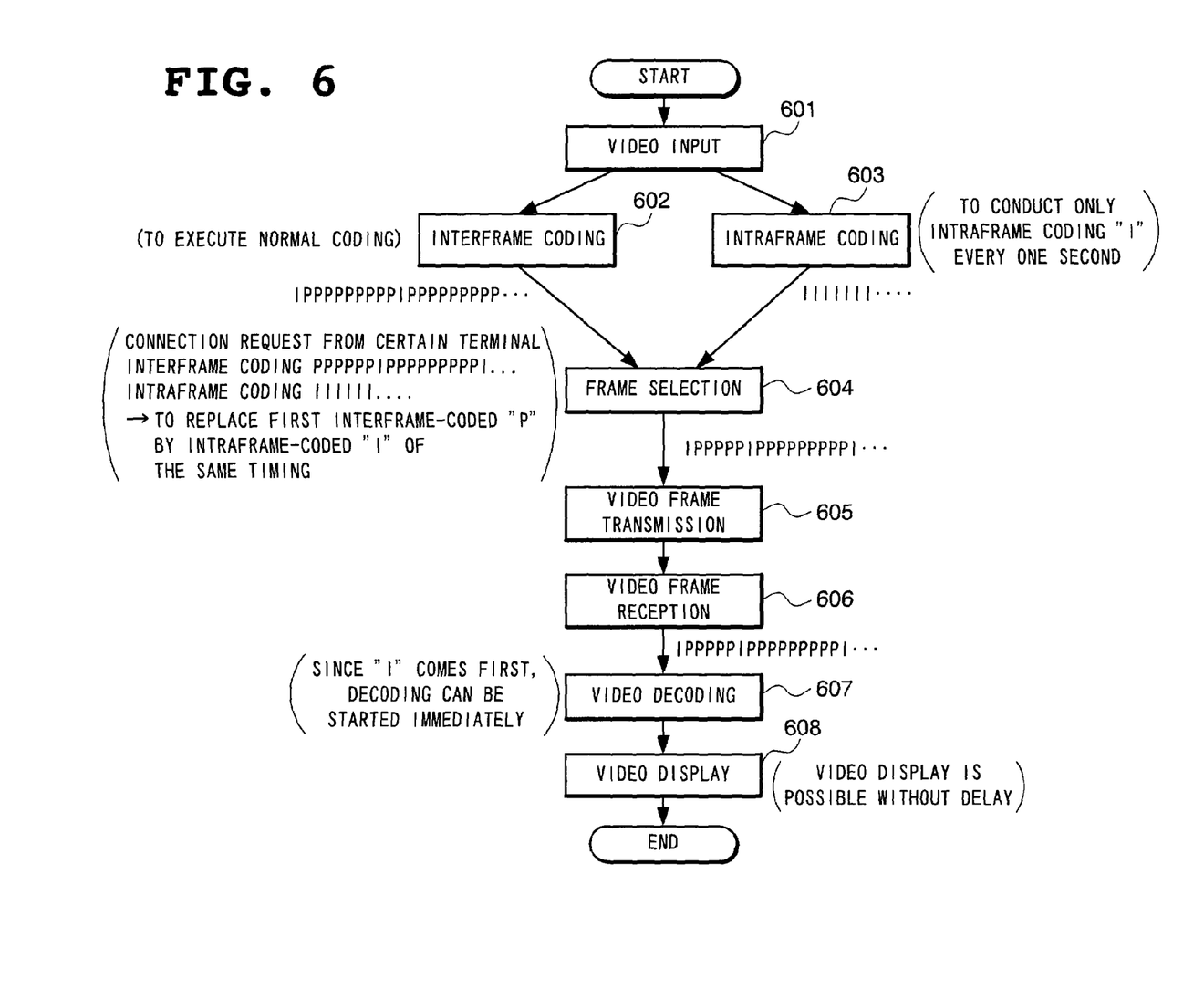
FIG. 6 is a diagram for use in explaining processing conducted by the contents distribution system according to the first embodiment of the present invention.

The processing of the present embodiment shown in FIG. 6, unlike the conventional processing shown in FIG. 9, is characterized in that video contents applied to the input unit 21 are coded by two coding systems by the intraframe coding unit 22 and the interframe coding unit 23.

Although the interframe coding unit 23 inserts an intraframe-coded video frame "I" at fixed intervals (10 seconds in this example) similarly to the conventional processing, most of video frames used are interframe-coded video frames "P". On the other hand, the intraframe coding unit 22 codes every video frame by intraframe coding (every video frame is "I").

In a case where decoded data is displayed as moving pictures, however, while the interframe coding unit 23 needs to output coded video frames at an interval shorter than 0.1 second, the intraframe coding unit 22 only needs to output intraframe-coded video frames "I" at an interval of, for example, one second.

The intraframe coding unit 22 and the interframe coding unit 23 need to be synchronized with each other such that for the same video, "I" is coded by the intraframe coding unit 22 and "P" (or "I") is coded by the interframe coding unit 23. "I" thus coded by the intraframe coding unit 22 whose interval is one second and "P" coded by the interframe coding unit 23 ("I" having an interval of 10 seconds) are both applied to the frame selection unit 31.

Here, assume that the terminal 40 changes a currently watching program at a certain time to start viewing and listening to another program.

The start request is issued from the terminal request reception unit 33 to the frame selection unit 31. Upon receiving the request, the frame selection unit 31 selects input to the intraframe coding unit 22 and the interframe coding unit 23 which are coding the program in question to change from the intraframe coding unit 22 and the interframe coding unit 23 which are coding the current program.

Subsequently, wait for the intraframe-coded "I" which is coded by the intraframe coding unit 22 and when a coded "I" comes, the unit 31 transmits the intraframe-coded "I" as an initial frame. Thereafter, the unit transmits a frame ("P" or "I") subsequent to "P" (or "I") coded by the interframe coding unit 23 in synchronization with the "I" in question.

Since when the frames are thus selected and transmitted, the terminal 40 has an intraframe-coded video frame "I" as an initial frame at the decoding conducted by the decoding unit 42, decoding can be instantaneously started, thereby allowing a user to view and listen to video without being kept waiting so long since a request for viewing and listening to a program is issued.

The waiting time is zero at the minimum and an output interval of a video frame intraframe-coded by the intraframe coding unit 22 at the maximum (one second in this case), whose average is half the output interval of a video frame intraframe-coded by the interframe coding unit 22 (0.5 seconds in this case).

Although at the selection of an initial intraframe-coded video frame by the frame selection unit 31, the unit here waits only for the arrival of data coded by the intraframe coding unit 22, when an intraframe-coded video frame arrives first among data coded by the interframe coding unit 23, which is a state whose probability is low, selecting the frame as an initial frame further reduces an average waiting time.

Although the description has been here made of a case as an example where a user starts viewing or listening to a program, this is also applicable to a case where a user wants to change a program to be viewed or listened.

In addition, when an error occurs on a transmission path in a radio line due to radio wave conditions, decoding data coded by the interframe coding results in accumulating errors to disturb images in some cases which will remain disturbed until an intraframe-coded video frame "I" is received. In this case, a user makes a request for video refresh by means of the request input unit 45 and when the request is transmitted to the distribution server, the terminal request reception unit 33 receives the refresh request to issue a video refresh request to the frame selection unit 31.

Upon receiving the request, the frame selection unit 31 waits for an intraframe-coded "I" which is coded by the intraframe coding unit 22 and transmits the arrived intraframe-coded "I" similarly to the operation at the time of starting viewing and listening to a program. Thereafter, the unit 31 transmits a frame ("P" or "I") subsequent to "P" (or "I") coded by the interframe coding unit 23 in synchronization with the "I" in question.

Even when video is disturbed, explicitly making a refresh request by a user will stop video disturbance in zero second at the minimum, in a time of an interval of intraframe coding by the intraframe coding unit 22 (one second here) at the maximum and on average half the interval of intraframe coding by the intraframe coding unit 22 (0.5 seconds here) from when the request is made until when an intraframe-coded video frame is received to rectify the disturbance of the image.

As described in the foregoing, by thus using the frame selection unit 31, the contents distribution system of the present embodiment quickly copes with user's request for start of viewing and listening to a program, and program change and refresh and enables efficient use of a band of a transmission path.

In conventional techniques (FIGS. 8 and 9), also possible as a method of quickly responding to a user's request is changing a coding method at the interframe coding unit 23 according to a user's request. In other words, when a user makes a request for starting viewing and listening to a program, the interframe coding unit 23 conducts intraframe coding according to the user's request at a time point of reception of the request and thereafter conducts interframe coding ordinarily.

This method as compared with the method of the present embodiment using the frame selection unit 31, however, has disadvantages in the following points (1) and (2).

(1) As many interframe coding units 23 should be prepared as the number of the terminals 40*a* to increase costs of the distribution server 10*a*. Cost increase in particular when the number of the terminals 40*a* to be served simultaneously is increased is not negligible. Conversely, when using the frame selection unit 31, only one intraframe coding unit 22 and the interframe coding unit 23 are required for video contents to be distributed to reduce costs of the distribution server 10.

(2) With one interframe coding unit 23 prepared for video contents to be distributed so as to respond to a user's request, when the user makes a request for starting viewing and listening to a program, intraframe-coded video frames will be sent to users simultaneously viewing and listening to the same program to wastefully use a band of a transmission path for the users with intraframe-coded data, resulting in deteriorating image quality.

Figure 7:
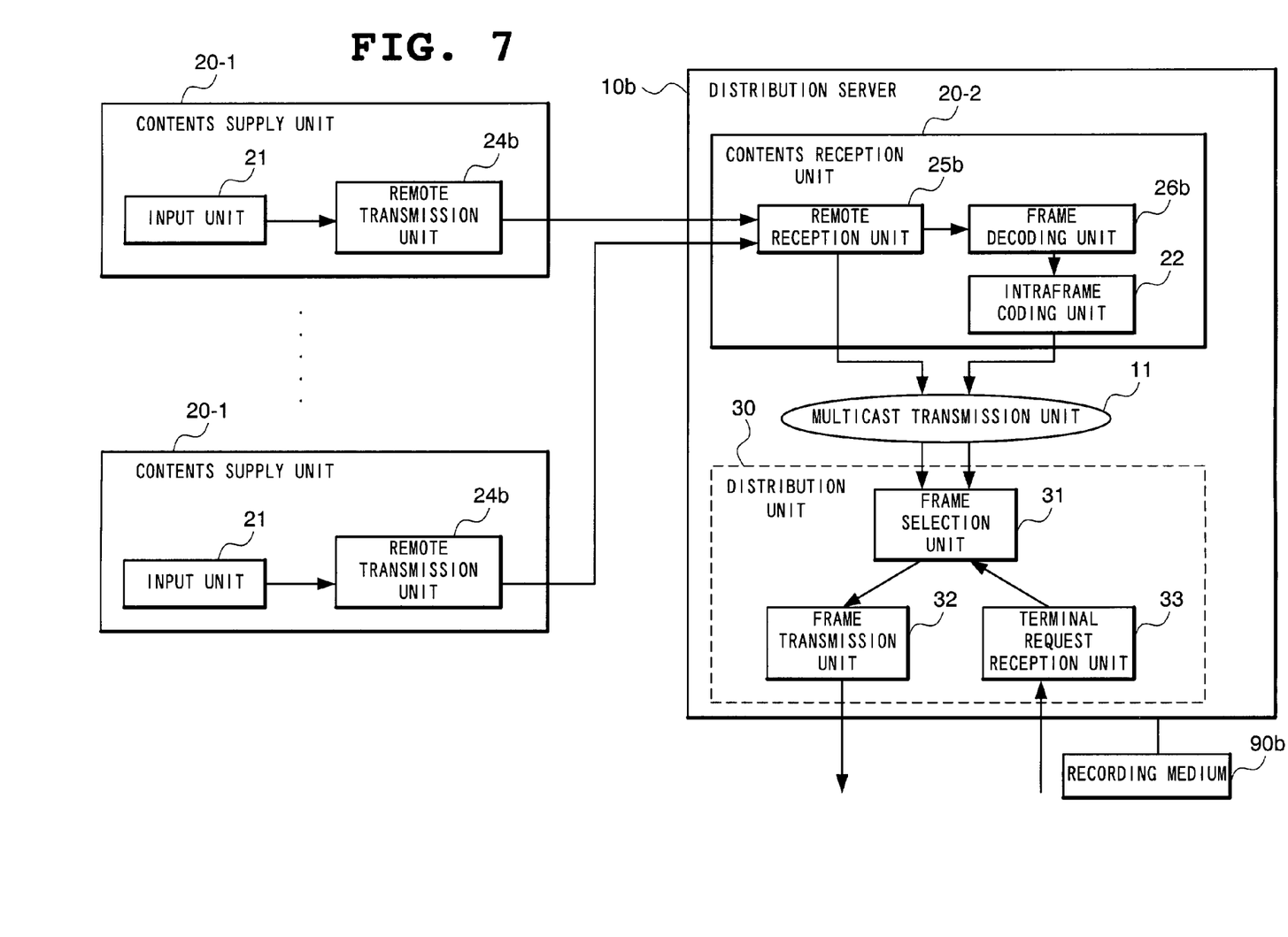
FIG. 7 is a block diagram showing a structure of a contents distribution system according to a second embodiment of the present invention.

FIG. 7 is a block diagram showing a structure of a distribution server according to a second embodiment of the present invention.

The present embodiment is premised particularly on a case where the distribution unit 30 of a distribution server 10*b* and a contents supply unit 20-1 are located at different places. In FIG. 7, the contents input unit 20 of the first embodiment is divided into the externally disposed contents supply unit 20-1 and a contents reception unit 20-2 on the side of the distribution server 10*b*.

In a case, for example, where a camera is disposed at a place where traffic congestion frequently occurs on a highway to provide its congestion information to users, the place where the camera is arranged is in many cases away from a place where a main body of a device for distributing video is disposed. The first embodiment shown in FIG. 1 involves no inconvenience when the two places can be connected by a high-speed line, while there are many cases where they can be connected only with a radio line similar to a transmission path for connecting the terminal 40 and the distribution server 10*b* or with a common telephone line.

In such a case, the contents supply unit 20-1 transmits video contents input through the input unit 21 to the contents reception unit 20-2 of the distribution server 10*b* by means of a remote transmission unit 24*b* and a remote reception unit 25*b* receives the video frame.

The remote transmission unit 24*b* here transmits the contents to the remote reception unit 25*b* after interframe-coding the same with an intraframe-coded frame inserted at fixed intervals (10 seconds or the like) as described in the first embodiment.

The video frame received by the remote reception unit 25*b* is transferred to a frame decoding unit 26*b* and the frame selection unit 31. The frame decoding unit 26*b* decodes the received video frame which will be further intraframe-coded at the intraframe coding unit 22. The intraframe-coded data is applied to the frame selection unit 31 through the multicast transmission unit 11. The frame selection processing and following processing are the same as those of the first embodiment.

Since the data is here decoded by the frame decoding unit 26*b* and furthermore intraframe-coded by the intraframe coding unit 22, an intraframe-coded video frame "I" arrives at the frame selection unit 31 later than an interframe-coded video frame "P", so that the frame selection unit 31 needs to synchronize the two frames.

Although the respective embodiments have been described with respect to coding of broadcast-transmitted video contents, distribution of accumulated video can be similarly executed.

More specifically, in a case of accumulated video, video is coded in advance and stored in an accumulation unit and in response to a request from a terminal, read from the accumulation unit and distributed to the terminal. Since read is started at an initial frame which is ordinarily coded by intraframe coding, the terminal is allowed to conduct decoding starting with the initial frame. Also in this case, however, refreshing for an error is impossible and therefore, video frames coded only by intraframe coding are accumulated and selected by the frame selection unit 31 to cope with refreshing of an error.

In the contents distribution systems according to the above-described respective embodiments, functions of the intraframe coding unit 22, the interframe coding unit 23, the multicast transmission unit 11, the frame selection unit 31 and the like of the distribution servers 10, 10*a* and 10*b*, the functions of the decoding unit 42, the display unit 43, the request transmission unit 44, the request input unit 45 and the like of the user's terminals 40 and 40*a* and other functions can be realized not only by hardware but also by loading a computer program having each function into a memory of a computer processing device. The computer program is stored in recording media 90, 90*a*, 90*b*, 91 and 91*a* such as a magnetic disc and a semiconductor memory. Then, loading the program from the recording medium into the computer processing device to control operation of the computer processing device realizes each of the above-described functions.

As described in the foregoing, the contents distribution system of the present invention attains the following effects.

First, it is possible to distribute one or a plurality of video contents to a plurality of terminals to enable each terminal to view and listen to video contents while freely changing a program.

Secondly, even when a user's terminal starts viewing or listening or changes a program, the program can be quickly displayed and presented to the user in response to the user's request. Also when video is disturbed due to an error on a transmission path or the like, user's issuance of a video refresh request enables the disturbance of the video to be quickly rectified.

Thirdly, even when a place of supplying video contents and a place where a main body which executes distribution of video is disposed are away from each other, it is possible to efficiently distribute video contents and quickly cope with start of viewing and listening to a program, program change and program video refresh as in the second embodiment.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

What is claimed is:

1. A contents distribution system for distributing a plurality of contents to a plurality of terminals of each user through a communication network, comprising
    a distribution server which connects to said plurality of terminals through said communication network to distribute contents, wherein
    said distribution server includes:
    for each of said plurality of contents to be distributed, a plurality of contents input means for sequentially dividing data of the contents to be distributed into frames to generate frames coded by a predetermined plurality of different coding systems, and
    for each of said plurality of terminals of a distribution destination, a plurality of frame selection means for selecting, based on a request from said user's terminal, a frame appropriate for said request from among frames output from said contents input means,
    wherein each said frame selection means includes multicast transmission means for receiving in a multicast way a frame output from each said contents input means,
    wherein said contents input means:
    executes intraframe coding, which is coding based on data in an individual frame, of each frame of contents to be distributed to generate an intraframe-coded frame,
    executes interframe coding, which is coding based on data in an individual frame and correlation between the frames, of each frame of contents to be distributed to generate an interframe-coded frame, and
    sequentially outputs both of said intraframe-coded frame and said interframe-coded frame,
    wherein said contents input means simultaneously executes the intraframe coding and the interframe coding for said each frame of contents to be distributed,
    wherein when accepting, from said user's terminal, a request for distribution of new contents, a request for distribution of another contents and a refresh request for the purpose of elimination of an occurring failure, said frame selection means selects an intraframe-coded frame of the contents in question as a frame to be transmitted to the terminal in question,
    wherein when accepting a request for distribution of accumulated contents which have been coded, said frame selection means selects an intraframe-coded frame of the coded contents as a frame to be transmitted to the terminal in question,
    wherein when accepting said request for distribution of new contents, said request for distribution of another contents and said refresh request, for each of said plurality of contents to be distributed, said frame selection means outputs said intraframe-coded frame generated by said content input means as an initial frame to each said terminal, and sequentially then outputs said interframe-coded frame generated by said content input means as second and succeeding frames to each said terminal.

2. The contents distribution system as set forth in claim 1, wherein
    said contents input means includes:
    a contents obtaining unit for obtaining data of contents, and
    a contents accepting unit for receiving data of said contents from said contents obtaining unit through the communication network,
    said contents obtaining unit sequentially dividing data of the obtained contents into frames, generating an interframe-coded frame and transmitting the generated frame to said contents accepting unit through the communication network, and
    said contents accepting unit sequentially outputting both an interframe-coded frame received from said contents obtaining unit and an intraframe-coded frame of the contents in question which is generated by decoding the interframe-coded frame in question and then intraframe-coding the decoded frame.

3. The contents distribution system as set forth in claim 1, wherein
    said distribution server includes means for recording information of a kind of contents to be distributed as a program list and transmitting said program list recorded to said user's terminal.

4. The contents distribution system as set forth in claim 1, wherein said contents are video contents,
    wherein said distribution server outputs an intraframe-coded frame as a first frame to said user's terminal that made the request, and then said distribution server outputs a plurality of interframe-coded frames as second through nth frames to said user's terminal that made the request, n being a positive integer greater than one.

5. The contents distribution system as set forth in claim 1, further comprising:
    means for synchronizing the intraframe coding and the interframe coding performed by said content input means.

6. The contents distribution system as set forth in claim 1, wherein said content input means simultaneously outputs both of said intraframe-coded frame and said interframe-coded frame.

7. The contents distribution system as set forth in claim 1, wherein, when said contents corresponds to a moving picture, said frame selection means periodically outputs said intraframe-coded frame generated by said content input means to each said terminal, and in between said periodic outputs said frame selection means outputs said interframe-coded frame generated by said content input means to each said terminal.

8. A contents distribution server as a server unit for distributing a plurality of contents to a plurality of terminals of each user through a communication network, comprising:
for each of said plurality of contents to be distributed, a plurality of contents input units which sequentially divide data of the contents to be distributed into frames to generate frames coded by a predetermined plurality of different coding systems, and
for each of said plurality of terminals of a distribution destination, a plurality of frame selection units which select, based on a request from said user's terminal, a frame appropriate for said request from among frames output from said contents input units,
wherein each said frame selection unit includes multicast transmission means for receiving in a multicast way a frame output from each said contents input unit,
wherein each said contents input means unit:
executes intraframe coding, which is coding based on data in an individual frame, of each frame of contents to be distributed to generate an intraframe-coded frame,
executes interframe coding, which is coding based on data in an individual frame and correlation between the frames, of each frame of contents to be distributed to generate an interframe-coded frame, and
sequentially outputs both of said intraframe-coded frame and said interframe-coded frame,
wherein each said contents input unit simultaneously executes the intraframe coding and the interframe coding for said each frame of contents to be distributed,
wherein when accepting, from said user's terminal, a request for distribution of new contents, a request for distribution of another contents and a refresh request for the purpose of elimination of an occurring failure, said frame selection unit selects an intraframe-coded frame of the contents in question as a frame to be transmitted to the terminal in question,
wherein when accepting a request for distribution of accumulated contents which have been coded, said frame selection unit selects an intraframe-coded frame of the coded contents as a frame to be transmitted to the terminal in question,
wherein when accepting said request for distribution of new contents, said request for distribution of another contents and said refresh request, for each of said plurality of contents to be distributed, said frame selection unit outputs said intraframe-coded frame generated by said content input unit as an initial frame to each said terminal, and then sequentially outputs said interframe-coded frame generated by said content input unit as second and succeeding frames to each said terminal.

9. The contents distribution server as set forth in claim 8, wherein
each said contents input unit includes:
a contents obtaining unit which obtains data of contents, and
a contents accepting unit which receives data of said contents from said contents obtaining unit through the communication network,
said contents obtaining unit sequentially dividing data of the obtained contents into frames, generating an interframe-coded frame and transmitting the generated frame to said contents accepting unit through the communication network, and said contents accepting unit sequentially outputting both an interframe-coded frame received from said contents obtaining unit and an intraframe-coded frame of the contents in question which is generated by decoding the interframe-coded frame in question and then intraframe-coding the decoded frame.

10. The contents distribution server as set forth in claim 8, wherein said distribution server includes a program list storage unit which records information of a kind of contents to be distributed as a program list and transmitting said program list recorded to said user's terminal.

11. The contents distribution server as set forth in claim 8, wherein said contents are video contents,
wherein said contents distribution server outputs an intraframe-coded frame as a first frame to said user's terminal that made the request, and then said distribution server outputs a plurality of interframe-coded frames as second through nth frames to said user's terminal that made the request, n being a positive integer greater than one.

12. A distribution method of distributing a plurality of contents to a plurality of terminals of each user through a communication network, comprising the steps of:
for each of said plurality of contents to be distributed, sequentially dividing data of the contents to be distributed into frames to generate frames coded by a predetermined plurality of different coding systems;
for each of said plurality of terminals of a distribution destination, selecting, based on a request from said user's terminal, a frame appropriate for said request from among said generated frames;
wherein in said frame selection, receiving said frame in a multicast way,
wherein in said frame generation, comprising the steps of:
executing intraframe coding, which is coding based on data in an individual frame, of each frame of contents to be distributed to generate an intraframe-coded frame,
executing interframe coding, which is coding based on data in an individual frame and correlation between the frames, of each frame of contents to be distributed to generate an interframe-coded frame, and
sequentially outputting both of said intraframe-coded frame and said interframe-coded frame,
wherein the step of executing intraframe coding and the step of executing interframe coding are simultaneously performed for said each frame of contents to be distributed,
wherein further comprising,
in said frame selection, the step of when accepting from said user's terminal a request for distribution of new contents, a request for distribution of another contents and a refresh request for the purpose of elimination of an occurring failure, selecting an intraframe-coded frame of the contents in question as a frame to be transmitted to the terminal in question,
wherein when accepting a request for distribution of accumulated contents which have been coded, selecting an intraframe-coded frame of the coded contents as a frame to be transmitted to the terminal in question,
wherein when accepting said request for distribution of new contents, said request for distribution of another contents and said refresh request, for each of said plurality of contents to be distributed, outputting said intraframe-coded frame as an initial frame to each said terminal, and then sequentially outputting said interframe-coded frame as second and succeeding frames to each said terminal.

13. The distribution method as set forth in claim 12, comprising, in said frame generation, the steps of:
- obtaining data of contents and sequentially dividing data of the obtained contents into frames to generate an interframe-coded frame,
- receiving said frame through the communication line to sequentially outputting both the interframe-coded frame received and an intraframe-coded frame of the contents in question which is generated by decoding the interframe-coded frame in question and then intraframe-coding the decoded frame.

14. The distribution method as set forth in claim 12, further comprising the step of recording information of a kind of contents to be distributed as a program list and transmitting said program list recorded to said user's terminal.

15. The distribution method as set forth in claim 12, wherein said contents are video contents,
- wherein a distribution server outputs an intraframe-coded frame over the communication network as a first frame to said user's terminal that made the request, and then said distribution server outputs a plurality of interframe-coded frames over the communication network as second through nth frames to said user's terminal that made the request, n being a positive integer greater than one.

16. The distribution method as set forth in claim 12, further comprising:
- synchronizing execution of the intraframe coding and the interframe coding.

17. The distribution method as set forth in claim 12, wherein said intraframe-coded frame and said interframe-coded frame are simultaneously output.

18. The distribution method as set forth in claim 12, further comprising
- determining whether said contents corresponds to a moving picture, and if so,
- periodically outputting said intraframe-coded frame to each said terminal, and
- in between said periodic outputs of said intraframe-coded frame, outputting said interframe-coded frame generated to each said terminal.

19. A non-transitory computer readable medium containing program code, which, when executed, performs a contents distribution method for distributing a plurality of contents to a plurality of terminals of each user through a communication network by controlling a computer, comprising the functions of:
- for each of said plurality of contents to be distributed, sequentially dividing data of the contents to be distributed into frames to generate frames coded by a predetermined plurality of different coding systems, and
- for each of said plurality of terminals of a distribution destination, selecting, based on a request from said user's terminal, a frame appropriate for said request from among said frames generated,
- wherein in said frame selection, receiving said frames in a multicast way,
- wherein in said frame generation, further comprising the functions of:
- executing intraframe coding, which is coding based on data in an individual frame, of each frame of contents to be distributed to generate an intraframe-coded frame,
- executing interframe coding, which is coding based on data in an individual frame and correlation between the frames, of each frame of contents to be distributed to generate an interframe-coded frame, and
- sequentially outputting both of said intraframe-coded frame and said interframe-coded frame,
- wherein the function of executing intraframe coding and the function of executing interframe coding are simultaneously performed for said each frame of contents to be distributed,
- wherein the contents distribution method further comprises
- in said frame selection,
- the function of, when accepting from said user's terminal a request for distribution of new contents, a request for distribution of another contents and a refresh request for the purpose of elimination of an occurring failure, selecting an intraframe-coded frame of the contents in question as a frame to be transmitted to the terminal in question, and
- the function of, when accepting a request for distribution of accumulated contents which have been coded, selecting an intraframe-coded frame of the coded contents as a frame to be transmitted to the terminal in question,
- wherein when accepting said request for distribution of new contents, said request for distribution of another contents and said refresh request, for each of said plurality of contents to be distributed, the function of outputting said intraframe-coded frame as an initial frame to each said terminal, and sequentially outputting said interframe-coded frame as second and succeeding frames to each said terminal.

20. The non-transitory computer readable medium as set forth in claim 19, wherein the contents distribution method further comprises
in said frame generation, the functions of:
- obtaining data of contents and sequentially dividing data of the obtained contents into frames to generate an interframe-coded frame, and
- receiving said frame through the communication network and sequentially outputting both the interframe-coded frame received and an intraframe-coded frame of the contents in question which is generated by decoding the interframe-coded frame in question and then intraframe-coding the decoded frame.

21. The non-transitory computer readable medium as set forth in claim 19, wherein the contents distribution method further comprises the function of recording information of a kind of contents to be distributed as a program list and transmitting said program list recorded to said user's terminal.

22. The non-transitory computer readable medium as set forth in claim 19, wherein said contents are video contents,
- wherein a distribution server outputs an intraframe-coded frame over the communication network as a first frame to said user's terminal that made the request, and then said distribution server outputs a plurality of interframe-coded frames over the communication network as second through nth frames to said user's terminal that made the request, n being a positive integer greater than one.

23. The non-transitory computer readable medium as set forth in claim 19, wherein said intraframe-coded frame and said interframe-coded frame are simultaneously output.

* * * * *